(12) United States Patent
Park et al.

(10) Patent No.: US 12,341,168 B2
(45) Date of Patent: *Jun. 24, 2025

(54) ACTIVE MATERIAL REUSE METHOD USING CATHODE SCRAP

(71) Applicant: LG Energy Solution, Ltd., Seoul (KR)

(72) Inventors: Se-Ho Park, Daejeon (KR); Min-Seo Kim, Daejeon (KR); Doo-Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 606 days.

This patent is subject to a terminal disclaimer.

(21) Appl. No.: 17/763,799

(22) PCT Filed: Nov. 6, 2020

(86) PCT No.: PCT/KR2020/015555
§ 371 (c)(1),
(2) Date: Mar. 25, 2022

(87) PCT Pub. No.: WO2021/241818
PCT Pub. Date: Dec. 2, 2021

(65) Prior Publication Data
US 2022/0336879 A1  Oct. 20, 2022

(30) Foreign Application Priority Data
May 29, 2020 (KR) .................. 10-2020-0065045

(51) Int. Cl.
*H01M 10/54* (2006.01)
*C01G 51/42* (2025.01)
(Continued)

(52) U.S. Cl.
CPC ............ *H01M 10/54* (2013.01); *C01G 51/42* (2013.01); *C01G 53/44* (2013.01); *H01M 4/04* (2013.01);
(Continued)

(58) Field of Classification Search
CPC .......... H01M 10/54; H01M 4/04; H01M 4/13; H01M 4/485; H01M 2004/028;
(Continued)

(56) References Cited

U.S. PATENT DOCUMENTS 6,150,050 A    11/2000  Mathew et al.
8,882,007 B1 * 11/2014  Smith ................. H01M 10/54
                                              241/23

(Continued)

FOREIGN PATENT DOCUMENTS

CN    102651490 A    8/2012
CN    106450555 A *  2/2017
(Continued)

OTHER PUBLICATIONS

Extended European Search Report issued May 17, 2023 for corresponding European Patent Application No. 20937417.2.
(Continued)

*Primary Examiner* — Abdullah A Riyami
*Assistant Examiner* — Nader J Alhawamdeh
(74) *Attorney, Agent, or Firm* — Morgan, Lewis & Bockius LLP

(57) ABSTRACT

There is provided a method for collecting and reusing an active material from positive electrode scrap. The positive electrode active material reuse method of the present disclosure includes (a) thermally treating positive electrode scrap comprising a lithium composite transition metal oxide positive electrode active material layer on a current collector in air at 300 to 650° C. for 1 hour or less for thermal
(Continued)

decomposition of a binder and a conductive material in the active material layer, to separate the current collector from the active material layer, and collecting an active material in the active material layer, and (b) annealing the collected active material with an addition of a lithium precursor to obtain a reusable active material.

10 Claims, 8 Drawing Sheets

(51) Int. Cl.
*C01G 53/44* (2025.01)
*H01M 4/04* (2006.01)
*H01M 4/13* (2010.01)
*H01M 4/485* (2010.01)
*H01M 4/02* (2006.01)

(52) U.S. Cl.
CPC ............. *H01M 4/13* (2013.01); *H01M 4/485* (2013.01); *C01P 2002/72* (2013.01); *C01P 2002/85* (2013.01); *C01P 2004/51* (2013.01); *C01P 2006/34* (2013.01); *H01M 2004/028* (2013.01)

(58) Field of Classification Search
CPC ...... H01M 4/525; H01M 4/505; H01M 4/131; C01G 51/42; C01G 53/44; C01P 2002/72; C01P 2002/85; C01P 2004/51; C01P 2006/34; C01P 2004/03; C01P 2004/61; C22B 7/001; C22B 7/005; Y02P 10/20
See application file for complete search history.

(56) References Cited

U.S. PATENT DOCUMENTS

| | | | |
|---|---|---|---|
| 2012/0068107 A1 | 3/2012 | Chung et al. | |
| 2013/0266855 A1* | 10/2013 | Kim | H01M 4/5825 |
| | | | 148/206 |
| 2018/0123130 A1 | 5/2018 | Kim et al. | |
| 2018/0212282 A1 | 7/2018 | Lee et al. | |
| 2020/0044284 A1 | 2/2020 | Fujino et al. | |
| 2022/0336878 A1* | 10/2022 | Park | C22B 26/12 |
| 2022/0336879 A1* | 10/2022 | Park | C22B 7/001 |
| 2023/0045467 A1* | 2/2023 | Park | H01M 4/525 |
| 2023/0275278 A1* | 8/2023 | Kim | H01M 10/54 |
| | | | 429/209 |

FOREIGN PATENT DOCUMENTS

| | | |
|---|---|---|
| JP | 2004-349210 A | 12/2004 |
| JP | 4491085 B2 | 6/2010 |
| JP | 2012-064557 A | 3/2012 |
| JP | 5269228 B | 5/2013 |
| JP | 2016-085953 A | 5/2016 |
| JP | 6100991 B2 | 3/2017 |
| JP | 2020-021674 A | 2/2020 |
| KR | 10-0448272 B1 | 9/2004 |
| KR | 10-1328585 B1 | 11/2013 |
| KR | 10-2015-0002147 A | 1/2015 |
| KR | 10-2017-0033787 A | 3/2017 |
| KR | 10-2018-0046689 A | 5/2018 |
| KR | 10-1992715 B1 | 6/2019 |

OTHER PUBLICATIONS

Nie et al, "LiCoO2: recycling from spent batteries and regeneration with solid state synthesis," Green Chemistry, vol. 17, pp. 1276-1280 (2015).
International Search Report (with partial English translation) and Written Opinion issued in corresponding International Patent Application No. PCT/KR2020/015555 dated Feb. 25, 2021.
Office Action issued Aug. 19, 2023 for counterpart Chinese Patent Application No. 202080064196.4.

* cited by examiner

ACTIVE MATERIAL REUSE METHOD USING CATHODE SCRAP

TECHNICAL FIELD

The present disclosure relates to a method for reusing resources in the fabrication of a lithium secondary battery. More particularly, the present disclosure relates to a method for collecting and reusing positive electrode scrap generated in the lithium secondary battery fabrication process or positive electrode active materials of lithium secondary batteries discarded after use. The present application claims the benefit of Korean Patent Application No. 10-2020-0065045 filed on May 29, 2020 with the Korean Intellectual Property Office, the disclosure of which is incorporated herein by reference in its entirety.

BACKGROUND ART

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred in the process.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

DISCLOSURE

Technical Problem

The present disclosure is directed to providing a method for collecting and reusing active materials from positive electrode scrap.

Technical Solution

To achieve the above-described problem, a positive electrode active material reuse method of the present disclosure includes (a) thermally treating positive electrode scrap comprising a lithium composite transition metal oxide positive electrode active material layer on a current collector in air at 300 to 650° C. for 1 hour or less, for thermal decomposition of a binder and a conductive material in the active material layer, to separate the current collector from the active material layer, and collecting an active material in the active material layer, and (b) annealing the collected active material with an addition of a lithium precursor to obtain a reusable active material.

The thermal treatment may be performed for 30 min or less.

The lithium precursor may be at least one of LiOH, $Li_2CO_3$, $LiNO_3$ or $Li_2O$.

The lithium precursor may be added in an amount for adding lithium at a ratio of lost lithium to a ratio between lithium and other metal in a raw active material used in the active material layer.

For example, the lithium precursor may be added in an amount for adding lithium at a molar ratio of 0.001 to 0.4.

The annealing may be performed in air at 400 to 1000° C.

A temperature of the annealing step may exceed a melting point of the lithium precursor.

The active material in the active material layer may be collected in a form of powder, and carbon produced by carbonization of the binder or the conductive material may not remain on a surface.

The reusable active material may have a similar particle size distribution to the active material in the active material layer.

Another positive electrode active material reuse method according to the present disclosure includes (a) thermally treating positive electrode scrap in air at 300 to 650° C. for 1 hour or less, the positive electrode scrap left after punching a positive electrode plate in a positive electrode comprising a lithium composite transition metal oxide positive electrode active material layer on a current collector, for thermal decomposition of a binder and a conductive material in the active material layer, to separate the current collector from the active material layer, and collecting the active material in the active material layer, and (b) annealing the collected active material in air at 400 to 1000° C. with an addition of at least one of LiOH, $Li_2CO_3$, $LiNO_3$ or $Li_2O$.

Advantageous Effects

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. It is possible to collect the current collector since it does not dissolve the current collector. The extracted active material elements are not used as raw materials for positive electrode active material synthesis, and the active materials collected in the form of powder are directly reused, thereby achieving economical efficiency.

According to the present disclosure, since toxic and explosive solvents such as NMP, DMC, acetone and methanol are not used, thereby achieving safety, and since simple processes such as thermal treatment and annealing are used, it is easy to manage the process and suitable for mass production.

According to the present disclosure, it is possible to minimize the generation of undesirable reaction products such as LiF through very short thermal treatment, thereby eliminating the need for additional treatment such as washing to remove the reaction products.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
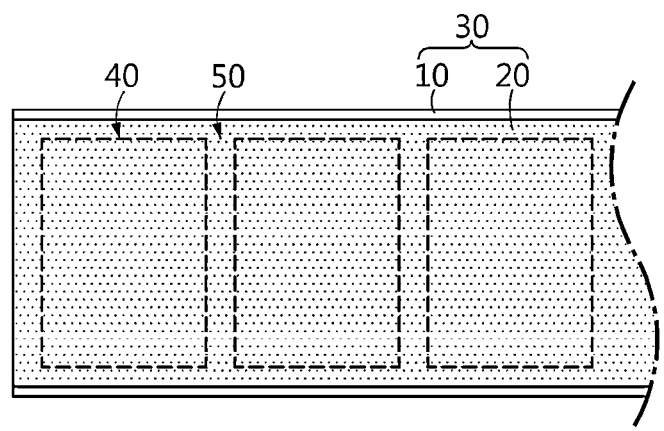
FIG. 1 is a diagram showing positive electrode scrap discarded after punching a positive electrode plate in a positive electrode sheet.

Hereinafter, the embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations shown in the drawings are just an example, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art).

The present disclosure is not limited to specific embodiments described herein. As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional active material reuse process is mainly aimed at extracting the elements of invaluable metal (nickel, cobalt, manganese) in active materials of lithium secondary batteries of which the performance degraded after use and re-synthesizing the active materials, and as opposed to the conventional process, the present disclosure is characterized as collecting active materials from positive electrode scrap generated in the lithium secondary battery fabrication process.

In addition, the well-known active material reuse process involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing positive electrode active materials directly without dissolving the positive electrode active materials.

To directly reuse the positive electrode active materials, it is necessary to remove the current collector from the positive electrode. The current collector may be removed from the positive electrode by removing the binder through high temperature thermal treatment, melting the binder using the solvent, melting the current collector, and screening the active materials through dry milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary.

Melting the current collector requires a lower process cost than using the solvent. However, it is difficult to remove impurities from the reusable active material surface, and hydrogen gas is produced in the current collector removal process, causing an explosion risk. Dry milling and sieving cannot perfectly separate the current collector and the active material. The particle size distribution of the active materials changes in the milling process and it is difficult to remove the binder, resulting in characteristics degradation of batteries including the reusable active materials.

The present disclosure separates the active material and the current collector using high temperature thermal treatment. Particularly, thermal treatment is performed in air, so the process only requires heating without any special device configuration and thus is relatively simple, and it is suitable for mass production and commercialization. However, impurities should not remain on the reusable active material surface. The present disclosure suggests the process condition for minimizing impurities on the reusable active material surface.

Figure 2:
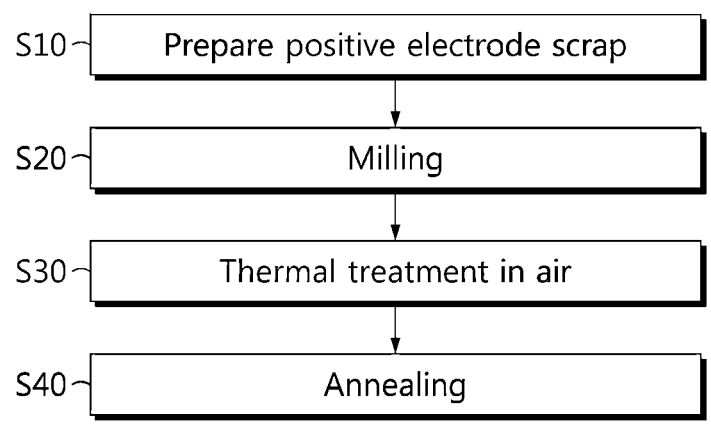
FIG. 2 is a flowchart of an active material reuse method according to the present disclosure.

Hereinafter, the active material reuse method according to an embodiment of the present disclosure will be described with reference to FIG. 2. FIG. 2 is a flowchart of the active material reuse method according to the present disclosure.

Referring to FIG. 2, first, waste positive electrode scrap is prepared (s10).

As described above with reference to FIG. 1, positive electrode scrap may be leftover after manufacturing a positive electrode sheet including a lithium composite transition metal oxide positive electrode active material layer on a current collector and punching the positive electrode sheet. In addition, positive electrode scrap may be prepared by collecting positive electrodes in which defects or failures occurred in the process. Additionally, positive electrode scrap may be prepared by separating positive electrodes from lithium secondary batteries discarded after use.

For example, the positive electrode scrap may be the leftover after coating a slurry prepared by mixing lithium cobalt oxide such as $LiCoO_2$(LCO) as an active material or an NCM based active material including nickel, cobalt and manganese, carbon such as carbon black as a conductive material and polyvinylidene fluoride (PVdF) as a binder with N-methyl pyrrolidone (NMP) on a sheet type current collector of an aluminum foil, drying in a vacuum oven of about 120° C. to manufacture a positive electrode sheet, and punching the positive electrode plate into a predetermined size.

The positive electrode scrap has the active material layer on the current collector of a metal foil such as the aluminum foil. The active material layer is formed by coating the slurry including a mixture of the active material, the conductive material, the binder and the solvent, and after solvent volatilization, the active material and the conductive material are bonded by the binder. Accordingly, when the binder is removed, the active material may be separated from the current collector.

Subsequently, the positive electrode scrap is milled into a proper size (s20). The milling refers to cutting or shredding of the positive electrode scrap into a proper size for handling. After the milling, the positive electrode scrap is cut to, for example, 1 cm×1 cm. A variety of dry milling equipment including a hand-mill, a pin-mill, a disk-mill, a cutting-mill and a hammer-mill, and a high speed cutter may be used in the milling.

The milling may be performed considering the handling of the positive electrode scrap and the characteristics required in equipment used in the subsequent processes. For example, when equipment requiring continuous treatment is used to load and unload the positive electrode scrap, it is necessary to mill too large positive electrode scrap to facilitate the movement of the positive electrode scrap.

Subsequently, the positive electrode scrap is thermally treated in air (s30).

In the present disclosure, thermal treatment is performed for thermal decomposition of the binder in the active material layer. The thermal treatment may be performed at 300 to 650° C., and may be referred to as high temperature thermal treatment. At the temperature of less than 300° C., it is difficult to remove the binder, failing to separate the current collector, and at the temperature of 650° C. or above, the current collector melts (Al melting point: 660° C.), failing to separate the current collector.

The thermal treatment time is long enough for thermal decomposition of the binder. The thermal treatment time is 1 hour or less. Preferably, the thermal treatment time is 30 min or less. As the thermal treatment time increases, the thermal decomposition of the binder is prolonged, but when the thermal treatment time is longer than a predetermined time, there is no difference in thermal decomposition effect, and many reaction products are generated and adversely affect the battery performance.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 550° C. or 600° C. for 30 min at the temperature rise rate of 5° C./min. For example, the temperature rise rate is within the allowable range of the box type furnace and is enough to heat the positive electrode scrap without thermal shock. 550° C. and 600° C. is set taking into account the melting point of the Al current collector and for good thermal decomposition of the binder. When the thermal treatment is performed at the above-described temperature for less than 10 min, thermal decomposition is insufficient, and thus it is necessary to perform the thermal treatment for 10 min or longer, and preferably for 30 min.

$CO_2$ and $H_2O$ are removed by the thermal decomposition of the binder and the conductive material in the active material layer through the thermal treatment in air. Since the binder is removed, the active material may be separated from the current collector and the active material to collect may be screened in the form of powder. Accordingly, the current collector may be separated from the active material layer and the active material in the active material layer may be collected by s30.

It is important to perform the thermal treatment of s30 in air. When the thermal treatment is performed in a reducing or inert gas atmosphere, the binder and the conductive material suffer carbonization rather than thermal decomposition. When carbonized, carbon remains on the active material surface and degrades the performance of the reusable active materials. When the thermal treatment is performed in air, carbon in the binder or the conductive material is removed by combustion reaction with oxygen to produce CO, $CO_2$ gas, and thus the binder and the conductive material do not remain and are almost removed.

Accordingly, according to the present disclosure, the active material is collected in the form of powder, and carbon produced by the carbonization of the binder or the conductive material may not remain on the surface.

However, long thermal treatment may generate many undesirable reaction products such as LiF. Accordingly, the thermal treatment time is limited to 1 hour or less, and preferably 30 min or less, to minimize the generation of unwanted impurities that may adversely affect the battery performance.

Subsequently, annealing is performed with an addition of a lithium precursor to the collected active material (s40). s40 yields reusable active materials.

Losses of lithium in the active material may occur through the previous step s30. s40 compensates for the lithium loss.

Besides, s40 recovers the crystal structure of the active material through annealing so that the characteristics of the reusable active material may be recovered or improved to the fresh active material level.

The active material surface structure may be modified on through the previous step s30. Besides, in the case of LCO active material, $Co_3O_4$ may be produced on the surface by thermal decomposition. When a battery is manufactured, leaving $Co_3O_4$ on the surface, the battery characteristics may degrade. The present disclosure may recover the crystal structure and remove $Co_3O_4$ through s40 so that the initial characteristics may be recovered or improved to the similar level to fresh active materials.

The lithium precursor in s40 may be at least one of LiOH, $Li_2CO_3$, $LiNO_3$ or $Li_2O$.

The lithium precursor is added in an amount for adding lithium at a ratio of lost lithium to a ratio between lithium and other metal in the raw active material (i.e., fresh active material) used in the active material layer. For example, a ratio between lithium and other metal in the fresh active material is 1, the lithium precursor may be added in an amount for adding lithium at the molar ratio of 0.001 to 0.4. It is proper to add lithium at a molar ratio of 0.01 to 0.2. The addition of the lithium precursor exceeding the lithium loss leaves unreacted lithium precursors on the reusable active material, causing the increased resistance in the active material reuse process, and accordingly it is necessary to feed the lithium precursor in a proper amount.

The annealing may be performed in air at 400 to 1000° C. The annealing temperature may be 600 to 900° C. The temperature changes within the limited range depending on the type of the lithium precursor. The annealing time may be at least 1 hour. Preferably, the annealing time is about 5 hours. When the annealing time is long, the crystal structure may be sufficiently recovered, but the prolonged annealing does not greatly affect the performance. The annealing time is, for example, about 15 hours or less. The annealing equipment may be similar or identical to that of the thermal treatment step s30.

For example, when $Li_2CO_3$ is used as the lithium precursor, the annealing temperature is preferably 700 to 900° C., and more preferably, 710 to 780° C. It is because the melting point of $Li_2CO_3$ is 723° C. Most preferably, the annealing is performed at 750° C. When LiOH is used as the lithium precursor, the annealing temperature is preferably 400 to 600° C., and more preferably, 450 to 480° C. It is because the melting point of LiOH is 462° C.

Preferably, the annealing temperature is higher than the melting point of the lithium precursor. However, at the temperature higher than 1000° C., the thermal decomposition of the positive electrode active material occurs and degrades the performance of the active material, and accordingly the annealing temperature does not exceed 1000° C. Most preferably, annealing is performed below the temperature before the start of thermal decomposition of the positive electrode active material, i.e., below the temperature at which 02 in the active material is released by high temperature treatment and a rapid mass reduction of TGA phase starts.

LCO and NCM are all subjected to structural destruction due to $O_2$ emission at too high temperature and have a significant reduction in the mass of the positive electrode active material. TGA measurements may detect the temperature at which a rapid mass reduction starts after thermal decomposition, and it is preferred to perform annealing at the corresponding temperature or lower.

According to the present disclosure, only two steps, thermal treatment in air (s30) and annealing with an addition of the lithium precursor (s40), are used to obtain reusable active materials. In particular, since the thermal treatment is performed for a very short time, and preferably for 30 min or less, it is possible to prevent the generation of reaction products that adversely affect the battery characteristics, thereby eliminating the need for an additional step for removing the reaction products such as washing. Additionally, it is possible to remove substances that may cause a problem when remaining on the LCO active material, for example, $Co_3O_4$ through annealing safely and effectively at a low cost, and recover the battery characteristics of reusable active materials by recovering the crystal structure, i.e., improve the crystallinity. As described above, it is possible to obtain reusable active materials by the two steps, thermal treatment and annealing.

The reusable active material obtained according to the present disclosure may have a similar particle size distribution to the active material present in the active material layer within positive electrode scrap, requiring no separate treatment. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment, or may be mixed with fresh LCO, and may be used to prepare a slurry in combination with a conductive material, a binder and a solvent.

Hereinafter, the experimental example of the present disclosure will be described in detail.

Experimental Example

Positive electrode active materials are prepared by the method of the following example and comparative examples to evaluate the electrochemical performance.

Example: Reusable active materials are collected according to the active material reuse method of the present disclosure as described above. LCO positive electrode scrap discarded after punching the positive electrode plate is prepared and the thermal treatment of s30 is performed in air at 600° C. for 30 min at the temperature rise rate of 5° C./min. In s40, annealing is performed in air at 750° C. for 15 hours with an addition of a lithium precursor ($Li_2CO_3$) in an amount of excess 2 mol % lithium compared to lithium in reusable LCO.

Comparative example 1: Fresh LCO is used, not reusable active material.

Comparative example 2: The removal of the binder and the conductive material, the separation of the Al current collector and the collection of LCO active material are carried out by performing only the thermal treatment of s30 in the active material reuse method of the present disclosure as described above. s30 is performed in the same condition as the example. In the active material reuse method of the present disclosure, the crystal structure recovery of s40 is not performed.

Comparative example 3: LCO active material is collected by the same method as comparative example 2 except that the thermal treatment time is 1 hour.

Comparative example 4: LCO active material is collected by the same method as comparative example 2 except that the thermal treatment time is 5 hours.

96 wt % of the positive electrode active material collected or prepared in example and comparative examples, 2 wt % of carbon black as a conductive material and 2 wt % of PVdF as a binder are metered and mixed with NMP to prepare a slurry, a positive electrode is made, a cell (Coin Half Cell, CHC) is manufactured and the electrochemical performance is evaluated.

Figure 3:
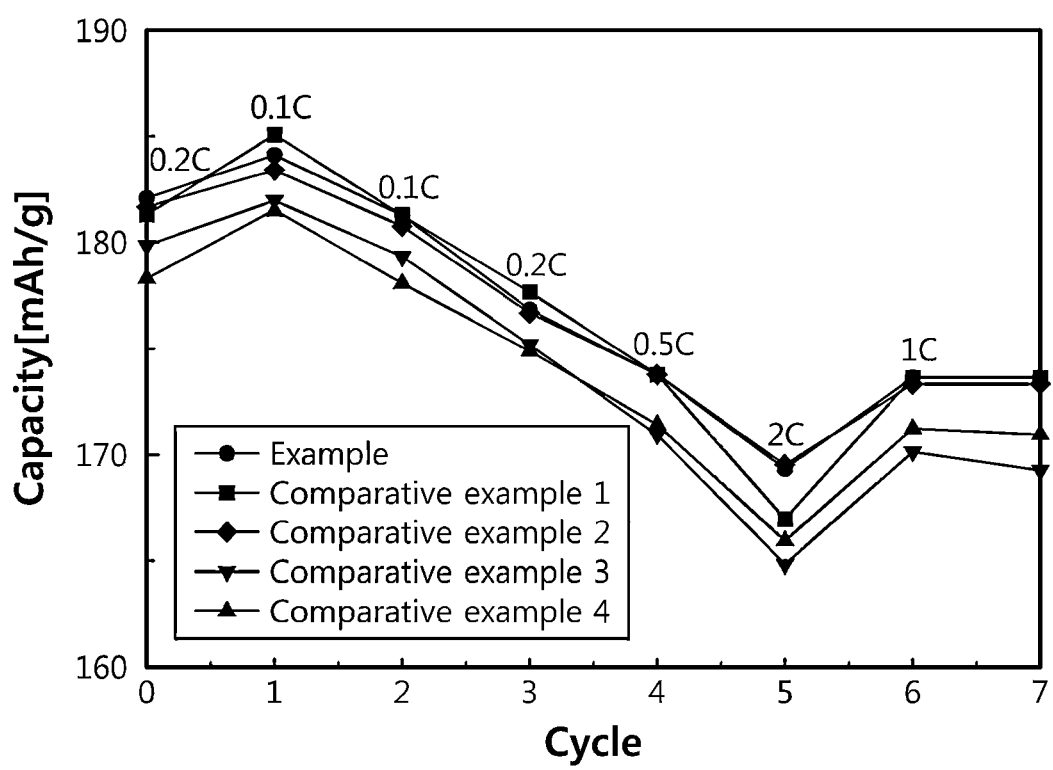
FIG. 3 shows the result of cell evaluation using active materials of example and comparative examples.

FIG. 3 shows the result of cell evaluation using the active materials of example and comparative examples. At different currents, capacity as a function of cycle number is evaluated to determine the rate performance. The equipment used for evaluation is a charge/discharge tester commonly used in the lab. There is no difference depending on the measuring device or method. In the graph of FIG. 3, the horizontal axis indicates the number of cycles and the vertical axis indicates capacity.

Voltage is 3 to 4.5V, and initial formation charge/discharge is performed at 0.2C/0.2C. The electrolyte solution for the cell is a carbonate based electrolyte solution and includes Ethylene carbonate (EC):Ethyl methyl carbonate (EMC)=3:7 with an addition of additives.

Referring to FIG. 3, the lowest rate performance is found in comparative example 4 having the longest thermal treatment time of 5 hours. It is because when the high temperature thermal treatment process of s30 is performed for a long time, the binder and the conductive material are removed to produce $CO_2$ and $H_2O$, which react with lithium on the positive electrode active material surface to produce $Li_2CO_3$, which, in turn, reacts with F present in the binder to produce LiF. Additionally, the low battery characteristics are presumably attributed to the presence of $Co_3O_4$ on the LCO surface due to the thermal decomposition.

Comparative example 3 has the thermal treatment time of 1 hour that is shorter than comparative example 4, and shows better rate performance than comparative example 4 for the first three cycles, but with the increasing number of cycles, the rate performance becomes poorer.

Comparative example 2 has the thermal treatment time of 30 min that is shorter than comparative examples 3 and 4. Comparative example 2 has better rate performance than comparative examples 3 and 4. Accordingly, it can be seen that the thermal treatment time of 30 min or less is desirable in terms of rate performance, and it is to minimize the generation of reaction products such as LiF.

Compared to comparative example 2, example performs annealing with an addition of a lithium precursor, and the annealing is performed with an addition of $Li_2CO_3$ to compensate for lithium lost in the process of collecting the active material and recover crystallinity. According to the example, not only compensation for lithium loss occurring in the process, but also modification structure on the active material surface during recycling and reduction of $Co_3O_4$ to LCO crystal structure lead to better results than the initial characteristics of the fresh active material of comparative example 1. According to the present disclosure, it is possible to collect the active material from the positive electrode scrap on the directly usable level. It is safe since toxic and explosive solvents such as NMP, DMC, acetone and methanol are not used, and since simple and safe methods such as thermal treatment and annealing are used, it is suitable for mass production.

Figure 4:
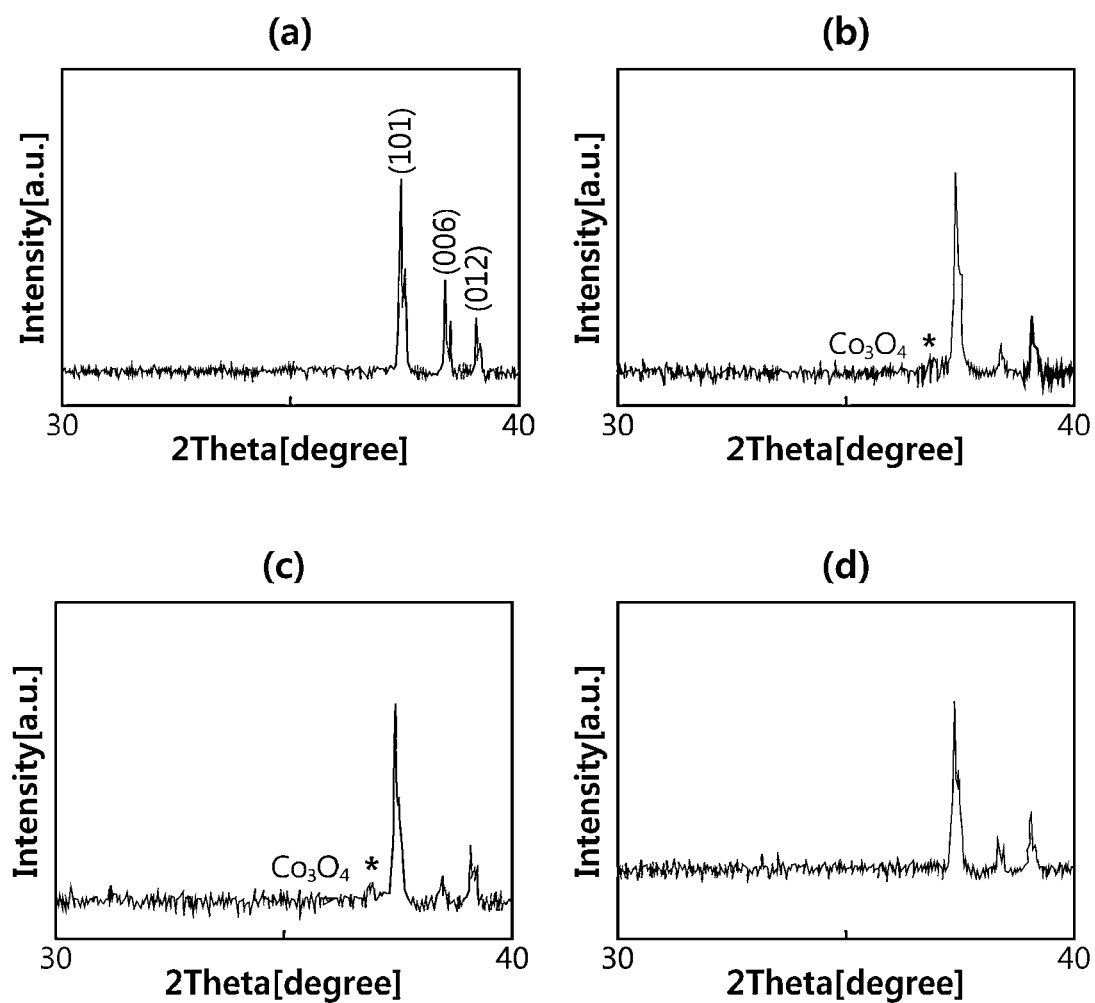
FIG. 4 shows X-Ray Diffraction (XRD) patterns of active materials of example and comparative examples.

FIG. 4 shows XRD patterns of the active materials of example and comparative examples. In the XRD patterns, the horizontal axis indicates 2θ(Theta) (degree, °), and the vertical axis indicates intensity. The XRD patterns may be acquired using an X-ray diffractometer commonly used in the lab. For example, analysis may be conducted using Rigaku X-ray diffractometer XG-2100. However, there is no difference depending on the device or method.

FIG. 4(a) shows the XRD pattern of comparative example 1, i.e., fresh LCO. FIG. 4(b) shows the XRD pattern of the active material of comparative example 2, and FIG. 4(c) shows the XRD pattern of the active material of comparative example 4. When comparing (b) and (c) with (a), $Co_3O_4$ phase is observed. That is, it can be seen that $Co_3O_4$ is produced on the surface of LCO in the thermal treatment of s30.

FIG. 4(d) shows the XRD pattern of the active material of example. When comparing (b) and (c) with (d), it can be seen that $Co_3O_4$ phase disappeared and the crystal structure was recovered to LCO through annealing of s40. Seeing the diffraction peak position in the XRD pattern, the crystal structure of (d) is similar to the crystal structure of (a). Accordingly, recovery of example of the present disclosure to the level of the fresh active material of comparative example 1 is verified. According to the present disclosure, it is possible to remove $Co_3O_4$ produced during the thermal treatment process in the annealing process, and collect the active material from the positive electrode scrap on the directly reusable level.

Figure 5:
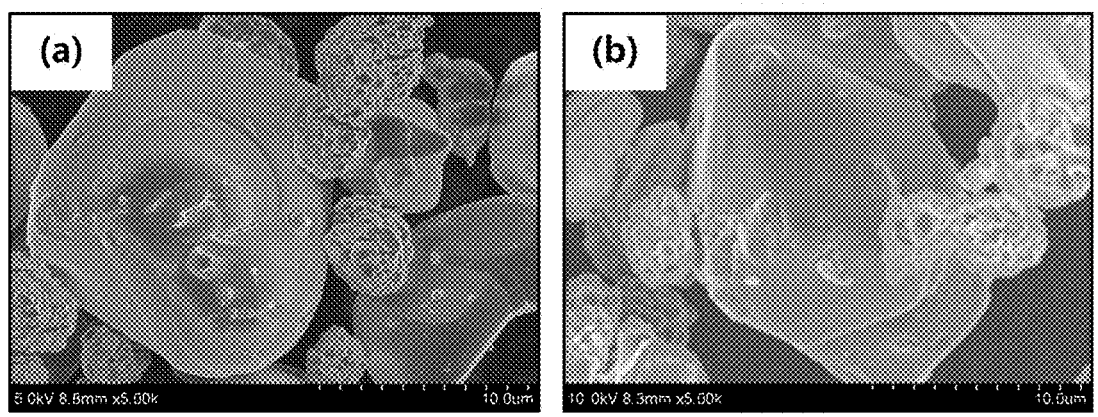
FIG. 5 is a Scanning Electron Microscope (SEM) photographic image of active materials of example and comparative examples.

FIG. 5 is a Scanning Electron Microscope (SEM) photographic image of the active materials of example and comparative examples. The SEM photographic image is captured using SEM equipment commonly used in the lab. For example, imaging may be performed using HITACHI s-4200. However, there is no difference depending on the measuring device or method.

FIG. 5(a) is the SEM photographic image of fresh LCO of comparative example 1, and FIG. 5(b) is the SEM photographic image of the reusable active material of example. It can be seen that when comparing with fresh LCO, the collected LCO of example shows the same shape. Besides, only LCO is observed, revealing that the binder and the conductive material were removed in the high temperature thermal treatment process. Accordingly, it can be seen that the active material is separated from the current collector and the binder or the conductive material scarcely remains on the active material surface by thermal treatment in air. According to the present disclosure, it is possible to separate the current collector and the active material without using a complex method or a harmful material, thereby collecting the active material in an eco-friendly manner. Since acids are not used, a neutralization process or a waste water treatment process is unnecessary, thereby achieving environmental mitigation and process cost reduction.

Figure 6:
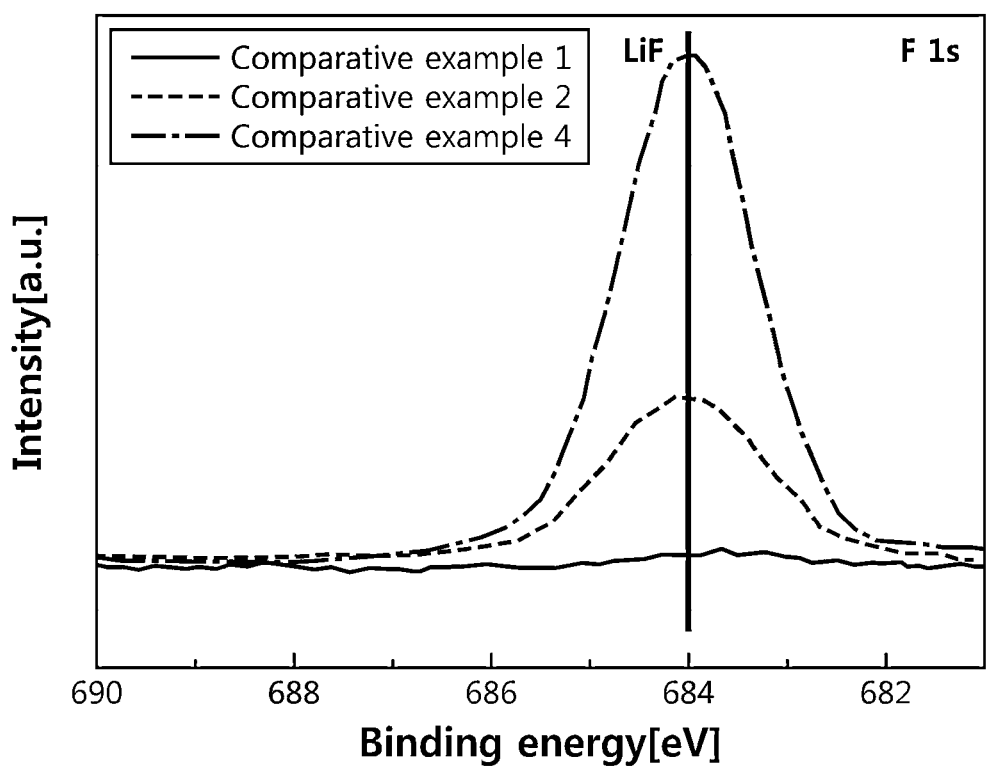
FIG. 6 shows X-Ray Photoelectron Spectroscopy (XPS) patterns of active materials of comparative examples.

FIG. 6 shows X-Ray Photoelectron Spectroscopy (XPS) patterns of the active materials of comparative examples. In the XPS pattern, the horizontal axis indicates Binding energy (unit: eV). The XPS pattern may be acquired using an XPS measuring instrument commonly in the lab. For example, analysis may be conducted using K-Alpha available from Thermo Fisher Scientific. As mentioned previously, F present in the binder may react with Li of the active material in the thermal treatment process to produce LiF. In FIG. 6, the peak around 684 eV is attributed to LiF, and for each sample, with the increasing intensity, a larger amount of LiF is present on the positive electrode active material surface. Since the XPS pattern of comparative example 1 is measured using fresh LCO, the presence of LiF is not measured. In comparative example 4, since a large amount of LiF is produced on the active material surface due to the long thermal treatment of 5 hours, the LiF peak intensity of XPS is measured much higher than comparative example 1. However, it can be seen that in the case of comparative example 2 where the thermal treatment time is reduced from 5 hours to 30 min, due to the binder decomposition, less F is produced and a smaller amount of LiF is present on the active material surface. Since LiF may be the cause of battery characteristics degradation, less LiF is better. Through the results of comparative example 4 and comparative example 2, it can be seen that the reduced thermal treatment time is effective in reducing the amount of LiF on the recycled active material surface and improving the performance of the recycled active material. Example has a similar level of LiF to comparative example 2, but as can be seen from the result of FIG. 3 above, it is possible to achieve a higher level than the fresh active material after annealing, and thus in the example, the amount of remaining LiF does not significantly affect the battery performance. Accordingly, the present disclosure does not need a separate process for removing LiF, such as washing.

Figure 7:
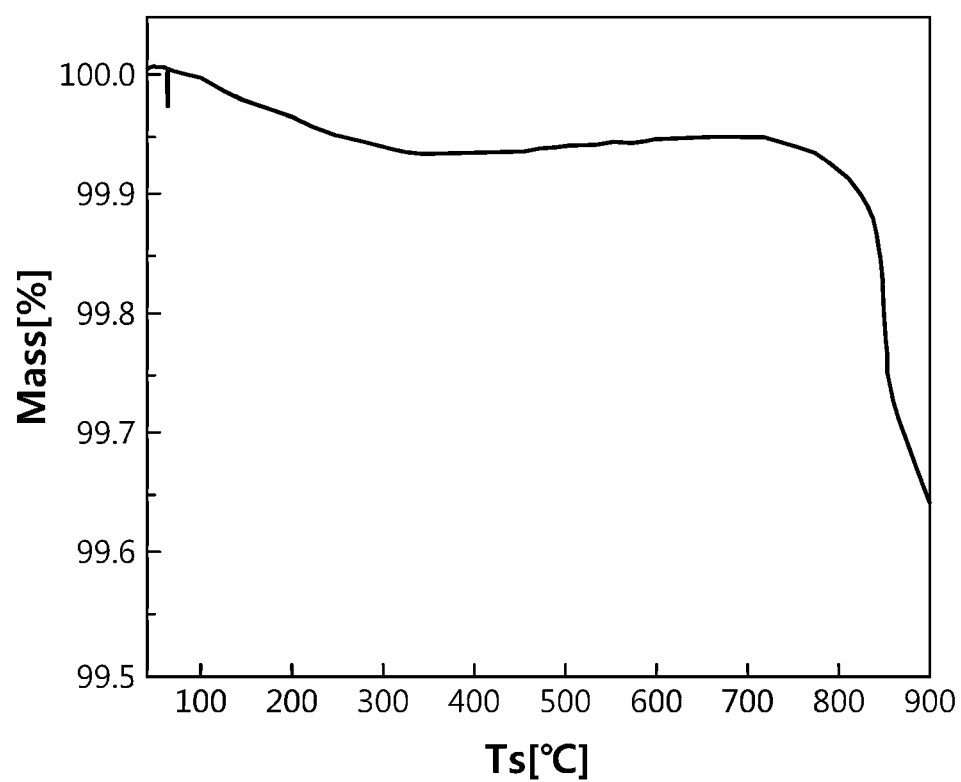
FIG. 7 shows the Thermogravimetric Analysis (TGA) analysis result of comparative example 2.

FIG. 7 shows the TGA analysis result of comparative example 2. TGA shows the mass continuously measured as a function of temperature. It can be seen that the LCO active material used in the experiment has a rapid mass reduction around 800° C. The weight reduction signifies thermal decomposition of the active material such as chemical bonds breaking and small molecules flying apart. By the experimental results, in the example, the experiment is performed at the annealing temperature of 750° C. that is lower than 800° C. and higher than the melting point (723° C.) of $Li_2CO_3$. Preferably, the annealing temperature is high enough to avoid thermal decomposition or heat-induced thermal degradation of the active material, and it is most preferred to find a temperature at which a rapid mass reduction starts through TGA measurements of the positive electrode active material and anneal below the corresponding temperature.

Figure 8:
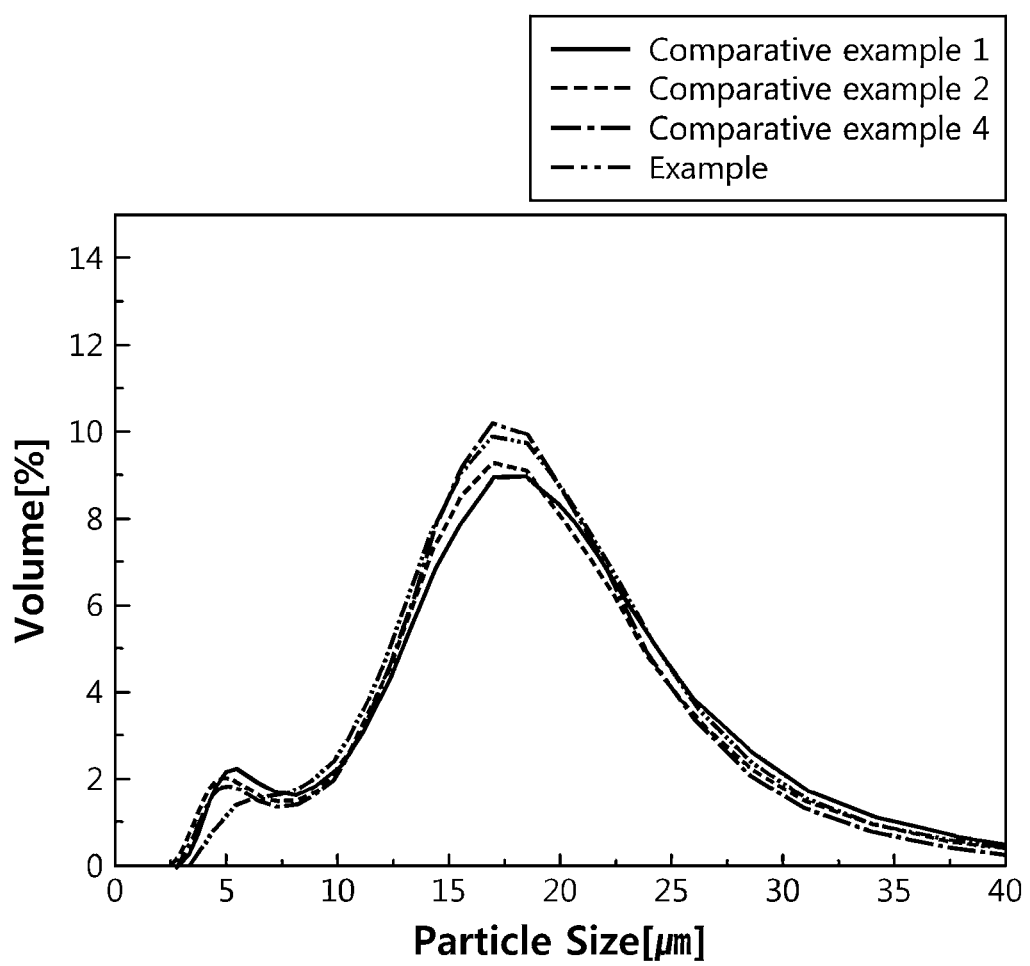
FIG. 8 is a particle size distribution graph of active materials of example and comparative examples.

FIG. 8 is a particle size distribution graph of the active materials of example and comparative examples. The particle size distribution may be acquired using a particle size analyzer commonly used in the lab. For example, measurements may be performed using Horiba LA 950V2 particle size analyzer. However, there is no difference depending on the measuring device or method. In FIG. 8, the horizontal axis indicates particle size (um) and the vertical axis indicates volume (%).

All the active materials collected in example and comparative examples 2 and 4 have similar particle size distributions compared to fresh LCO of comparative example 1. The particle size distribution is defined as similar when the volume % of particles having the same particle size has a difference within the range of +/−2%. According to the present disclosure, since the particle size distribution of the active material does not change and initial characteristics are almost maintained, it is expected that the characteristics of batteries including the reusable active materials will be on a similar level to the characteristics of batteries using fresh active materials.

Although the experimental examples use LCO active materials, obviously, the method according to the present disclosure may be applied to NCM based active materials.

According to the present disclosure, it is possible to reuse positive electrode scrap using a simple, eco-friendly and economical method, and a lithium secondary battery manufactured reusing the prepared LCO positive electrode active material does not have a problem with the battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method or reusing a positive electrode active material, comprising:
    thermally treating a positive electrode scrap comprising a lithium composite transition metal oxide positive electrode active material layer, which includes an active material, disposed on a current collector in air at 300 to 650° C. for 1 hour or less, for thermal decomposition of a binder and a conductive material in the active material layer,
    separating the current collector from the active material layer, collecting the active material; and
    annealing the active material with an addition of a lithium precursor to obtain a reusable active material.

2. The method according to claim 1, wherein the thermal treatment is performed for 30 min or less.

3. The method according to claim 1, wherein the lithium precursor is at least one of LiOH, $Li_2CO_3$, $LiNO_3$ or $Li_2O$.

4. The method according to claim 1, wherein the lithium precursor is added in an amount for adding lithium at a ratio of lost lithium to a ratio between lithium and other metal in a raw active material used in the active material layer.

5. The method according to claim 4, wherein the lithium precursor is added in an amount for adding lithium at a molar ratio of 0.001 to 0.4.

6. The method according to claim 1, wherein the annealing is performed in air at 400 to 1000° C.

7. The method according to claim 1, wherein a temperature of the annealing step exceeds a melting point of the lithium precursor.

8. The method according to claim 1, wherein the active material is collected in a form of powder, and carbon produced by carbonization of the binder or the conductive material does not remain on a surface.

9. The method according to claim 1, wherein the reusable active material has a similar particle size distribution to the active material in the active material layer.

10. A method of reusing a positive electrode active material, comprising:
- thermally treating a positive electrode scrap comprising a lithium composite transition metal oxide positive electrode active material layer, which includes an active material, disposed on a current collector in air at 300 to 650° C. for 1 hour or less, for thermal decomposition of a binder and a conductive material in the active material layer, wherein the positive electrode scrap is collected after punching a positive electrode plate in a positive electrode comprising the lithium composite transition metal oxide positive electrode active material layer on the current collector,
- separating the current collector from the active material layer,
- collecting the active material in the active material layer; and
- annealing the collected active material in air at 400 to 1000° C. with an addition of at least one of LiOH, $Li_2CO_3$, $LiNO_3$ or $Li_2O$.

* * * * *